United States Patent
Ryu et al.

(10) Patent No.: US 10,474,000 B2
(45) Date of Patent: Nov. 12, 2019

(54) LIQUID LENS AND LIQUID LENS MODULE

(71) Applicants: LG Display Co., Ltd., Seoul (KR); Korea Advanced Institute of Science and Technology, Daejeon (KR)

(72) Inventors: Sung-Pil Ryu, Paju-si (KR); Wook-Sung Kim, Goyang-si (KR); Han-Saem Kang, Paju-si (KR); Ki-Seok Chang, Paju-si (KR); Yong-Hyub Won, Daejeon (KR); Jun-Sik Lee, Seoul (KR); Doo-Seub Shin, Seoul (KR)

(73) Assignees: LG Display Co., Ltd., Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/629,062

(22) Filed: Jun. 21, 2017

(65) Prior Publication Data

US 2017/0363930 A1    Dec. 21, 2017

(30) Foreign Application Priority Data

Jun. 21, 2016    (KR) .......................... 10-2016-0077123

(51) Int. Cl.
*G02F 1/29* (2006.01)
*G02B 26/00* (2006.01)

(52) U.S. Cl.
CPC .............. *G02F 1/29* (2013.01); *G02B 26/005* (2013.01); *G02F 2001/291* (2013.01); *G02F 2202/16* (2013.01)

(58) Field of Classification Search
CPC ......... G02B 26/005; G02F 1/29; G02F 1/291; G02F 2202/16

USPC ........................................................ 359/315
See application file for complete search history.

(56) References Cited

U.S. PATENT DOCUMENTS

| | | | | |
|---|---|---|---|---|
| 2003/0076423 A1* | 4/2003 | Dolgoff | ................. | G03B 35/16 |
| | | | | 348/222.1 |
| 2007/0177276 A1* | 8/2007 | Liogier D'ardhuy | .... | G02B 3/14 |
| | | | | 359/666 |
| 2011/0255175 A1* | 10/2011 | Okita | ...................... | G02B 3/14 |
| | | | | 359/665 |

(Continued)

FOREIGN PATENT DOCUMENTS

CN        101606085 A       12/2009

OTHER PUBLICATIONS

Zhu et al., *Relationship between Refractive Index and Electron Wave Function and Calculation of Refractive Index*, Central University for Nationalities Press, Mar. 31, 2014, pp. 47-48. (with English Translation) (7 pages).

*Primary Examiner* — Collin X Beatty
*Assistant Examiner* — Grant A Gagnon
(74) *Attorney, Agent, or Firm* — Seed Intellectual Property Law Group LLP (57) ABSTRACT

Disclosed are a liquid lens and a liquid lens module, which enhance the fill factor of a liquid lens having an inclined partition, thereby achieving a low drive voltage and a high fill factor. The liquid lens includes an oil layer and a conductive liquid inside a chamber having an inclined partition. The oil layer is formed of an oil mixture obtained by mixing at least two types of oils having different indices of refraction, and the oil mixture has the index of refraction corresponding to the index of refraction of the material in which the chamber is formed.

18 Claims, 7 Drawing Sheets

(56) References Cited

U.S. PATENT DOCUMENTS

2012/0194563 A1* 8/2012 Liang ................... G02B 26/005
345/690
2013/0258277 A1* 10/2013 Pugh ...................... G02C 7/083
351/159.39
2015/0160452 A1* 6/2015 Aridomi .............. G02B 26/005
359/290

* cited by examiner

LIQUID LENS AND LIQUID LENS MODULE

CROSS-REFERENCE TO RELATED APPLICATION(S)

This application claims the benefit of Korean Patent Application No. 10-2016-0077123, filed on Jun. 21, 2016, which is hereby incorporated by reference as if fully set forth herein.

BACKGROUND

Technical Field

The present disclosure relates to a liquid lens and a liquid lens module, and more particularly, to a liquid lens and a liquid lens module, which may enhance the fill factor of a liquid lens having a chamber provided with an inclined partition.

Description of the Related Art

A liquid lens is a kind of a variable-focus lens that is made using an electrowetting phenomenon in which the use of electrodes coated with a particular insulation layer electrically changes the spreadability of liquid droplets so as to change the shape of the liquid droplets. Such a liquid lens is generally formed of two liquids that do not mix with each other. Here, one of the two liquids has an electrically conductive property and the other one has an insulation property. The liquid lens changes the curvature of the interface between the two liquids due to the variation in voltage which is applied to the electrodes. As the curvature of the interface between the two liquids changes, the focal length of the lens is also changed.

In order to make the liquid lens, a chamber capable of accommodating liquid is required. The chamber is defined by a vertical partition or an inclined partition. When the vertical partition is provided, although the effective lens portion of the liquid lens may be widened, and thus the fill factor of the liquid lens may be enhanced, it may be difficult to uniformly form an electrode layer on the chamber wall. On the other hand, when the chamber is defined by the inclined partition, although the inclined partition may ensure more uniform formation of an electrode layer compared to the vertical partition and may reduce a drive voltage, the effective lens portion may be narrowed due to the difference in the index of refraction between the chamber and the liquid, and thus, the fill factor of the liquid lens may be reduced.

BRIEF SUMMARY

Accordingly, the present disclosure is directed to various embodiments of a liquid lens and a liquid lens module that substantially obviate one or more problems due to limitations and disadvantages of the related art.

An object of the present disclosure is to provide a liquid lens and a liquid lens module, which may enhance the fill factor of a liquid lens having an inclined partition, thereby achieving a low drive voltage and a high fill factor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a liquid lens including an oil layer and a conductive liquid inside a chamber having an inclined partition, and the oil layer is formed of an oil mixture obtained by mixing at least two types of oils having different indices of refraction, and the oil mixture has an index of refraction corresponding to an index of refraction of the material in which the chamber is formed.

The inclined partition may have a gradient having any one value within a range from 40 degrees to 70 degrees.

The liquid lens may further include a first electrode disposed inside the chamber, and an insulation layer disposed on the first electrode.

The oil mixture, of which the oil layer is formed, may be a mixture of at least two types of oils selected from among dodecane, hexadecane, chloronaphthalene, bromododecane, and tetradecane.

The index of refraction of the oil layer and the index of refraction of the material in which the chamber is formed may have a difference within ±0.2.

The material in which the chamber is formed may be formed of any one of polymethyl methacrylate (PMMA), polyethylene tetraphthalate (PET), and polycarbonate (PC).

Assuming that the oil mixture is formed by mixing a first oil and a second oil, the index of refraction of the oil mixture is determined by the following Equation:

$$n^{id} = [\phi_A(n^*_A)^2 + \phi_B(n^*_B)^2]^{1/2}$$

(here, $\emptyset_A$ and $\emptyset_B$ are respectively percentages of the first oil and the second oil, and $n^*_A$ and $n^*_B$ are respectively indices of refraction of the first oil and the second oil).

As a concrete example of the liquid lens, the chamber of the liquid lens may be formed in a material made of PMMA, and the oil layer may include chloronaphthalene and dodecane in a ratio of approximately 6:4.

The liquid lens may further include a second electrode provided so as to come into contact with the conductive liquid.

It is to be understood that both the foregoing general description and the following detailed description of the various embodiments provided by the present disclosure are exemplary and explanatory and are intended to provide further explanation of the invention as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, exemplary embodiments of the present disclosure will be described with reference to the accompanying drawings. It should be noted that the same or substantially similar elements are designated by the same reference numerals throughout the accompanying drawings. In the following description of the present disclosure, a detailed description of known functions and configurations incorporated herein will be omitted when it may make the subject matter of the present disclosure rather unclear. In addition, the names of constituent elements used in the following description are selected in consideration of ease of description of the specification, and may differ from the names of parts of an actual product.

In the drawings for explaining the exemplary embodiments of the present disclosure, for example, the illustrated shape, size, ratio, angle, and number are given by way of example, and thus, are not limited to the disclosure of the present disclosure.

Figure 1:
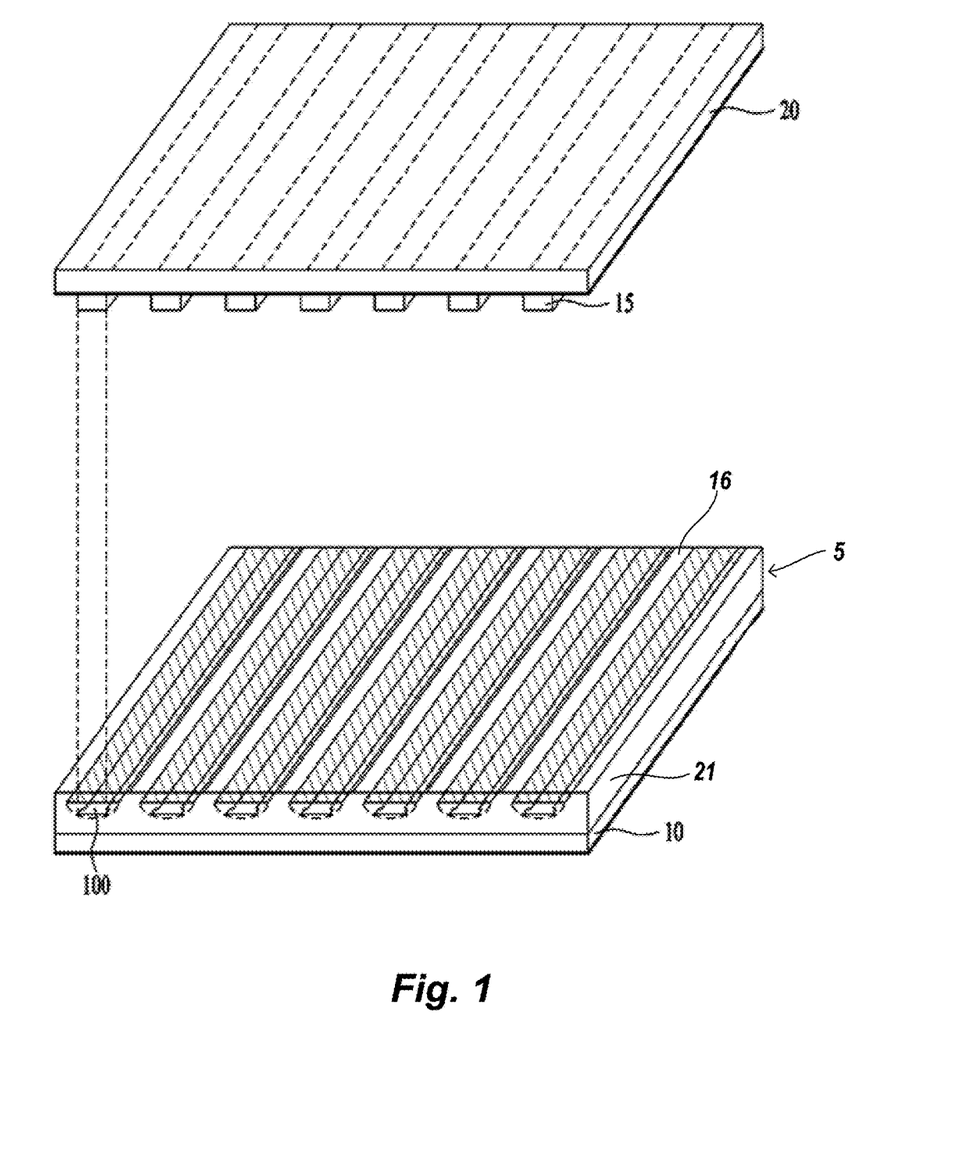
FIG. 1 is a schematic view illustrating a liquid lens array module according to one or more embodiments of the present disclosure.
Figure 2:
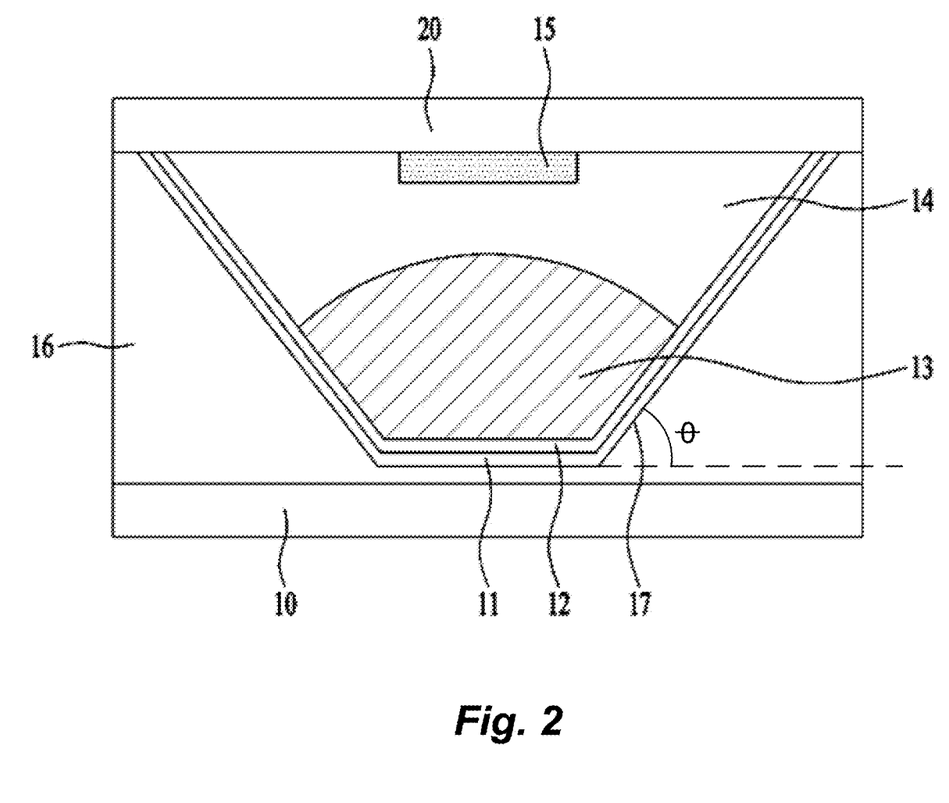
FIG. 2 is a cross-sectional view illustrating a liquid lens of the liquid lens module in detail.

FIG. 1 is a schematic view illustrating a liquid lens array module according to embodiments of the present disclosure, and FIG. 2 is a cross-sectional view for explaining each liquid lens of the liquid lens module in detail.

As illustrated in FIGS. 1 and 2, the liquid lens array module of the present disclosure includes a liquid lens array 5, which is located between a first substrate 10 and a second substrate 20. A material 21 is provided on the substrate 10 and has cavities formed therein. Portions of the material that are provided between adjacent cavities are shaped as inclined partitions 16. When the second substrate 20 is positioned on the material 21, enclosed chambers 17 are formed, and the chambers 17 have inclined sidewalls formed by respective inclined partitions 16 so as to define an open space therein, and which includes liquid lenses 100 placed in the chamber 17. The chamber 17 is thus a cavity in the material 21, having inclined sidewalls as defined by the inclined partition 16 of the material 21, and further having a lower surface between the inclined sidewalls, as shown. Each liquid lens 100 includes a first electrode 11 provided inside the chamber 17, an insulation layer 12 disposed on the first electrode 11, an oil layer 13 disposed inside the chamber 17 on the insulation layer 12, conductive liquid 14 provided over the oil layer 13, and a second electrode 15 provided on the second substrate 20 so as to be located over and in contact with the conductive liquid 14. In FIGS. 1 and 2, the second electrode 15 is provided on the second substrate 20, however, embodiments provided herein are not limited thereto.

The gradient of the inclined partition 16 provided in the chamber 17 may have an inclination angle θ having any value selected from the range from 40 degrees to 70 degrees, as measured from an axis parallel to a lower surface of the chamber 70, as shown.

The first electrode 11 may be formed using a metal such as, for example, gold (Au) or silver (Ag), or a transparent conductive material such as, for example, indium tin oxide (ITO) or indium zinc oxide (IZO). In this case, the first electrode 11 may be formed on the sidewall surface and/or the bottom surface of the chamber 17. The insulation layer 12 may be formed so as to cover the first electrode 11.

The oil layer 13 is formed of an oil mixture in which at least two types of oils having different indices of refraction are mixed. By mixing at least two types of oils having different indices of refraction as described above, the index of refraction of the oil mixture may be adjusted. The index of refraction of the oil mixture is adjusted so as to correspond to the index of refraction of the material 21 in which the chamber 17 is formed. In one or more embodiments, the index of refraction of the oil layer 13 formed of the oil mixture may be lower or higher than the index of refraction of the material 21 that forms the chamber 17 within a range of 0.2. For example, assuming that the index of refraction of material 21 that forms the chamber 17 is 1.4, the index of refraction of the oil layer 13 may range from 1.2 to 1.6. The oil layer 13 and the material 21 may have the same index of refraction.

The oil layer 13 may be formed of mixture oil including at least two types of oils selected from among hydrophobic oils such as, for example, dodecane, hexadecane, chloronaphthalene, bromododecane, and tetradecane. The material 21, in which the chamber 17 is formed, may be formed using any of various transparent plastic materials. For example, the material 21 may be formed of any one material such as, for example, polymethyl methacrylate (PMMA), polyethylene tetraphthalate (PET), or polycarbonate (PC). The index of refraction of the material 21 may be changed according to the constituent material of the material 21, and the components and the ratio of the oil mixture may be differently adjusted to suitably correspond to the index of refraction of the material 21 in which the chamber 17 is formed.

The index of refraction of the oil mixture, formed by mixing two types of oils (designated by A and B), is determined by the following Equation.

$$n^{id} = [\phi_A (n^*_A)^2 + \phi_B (n^*_B)^2]^{1/2} \qquad \text{Equation 1}$$

Here, $n^{id}$ is the index of refraction of the oil mixture. In addition, $\emptyset_A$ and $\emptyset_B$ are respectively the percentages of oil A and oil B, and $n^*_A$ and $n^*_B$ are respectively the indices of refraction of oil A and oil B. The oil mixture included in the oil layer 13 of the present disclosure is obtained by mixing the aforementioned hydrophobic oils at a given ratio according to the above Equation so that the index of refraction of the oil mixture is adjusted so as to correspond to the index of refraction of the material 21 in which the chamber 17 is formed.

The conductive liquid 14 may be an electrolyte aqueous solution including at least one of materials such as, for example, NaCl, KCl, sodium dodecyl sulfate (SDS), and dimethyl dithiocarbamate (DTC), or may be an ionic solution including at least one of materials such as, for example, 1-hexyl-3-methylimidazolium and 1-butyl-1-methylpyrrolidinium.

The second electrode 15 is formed on the second substrate 20 so as to come into contact with the conductive liquid 14. The second electrode 15 may be formed using a metal such as, for example, Au or Ag, or a transparent conductive material such as, for example, ITO or IZO.

Figure 3A:
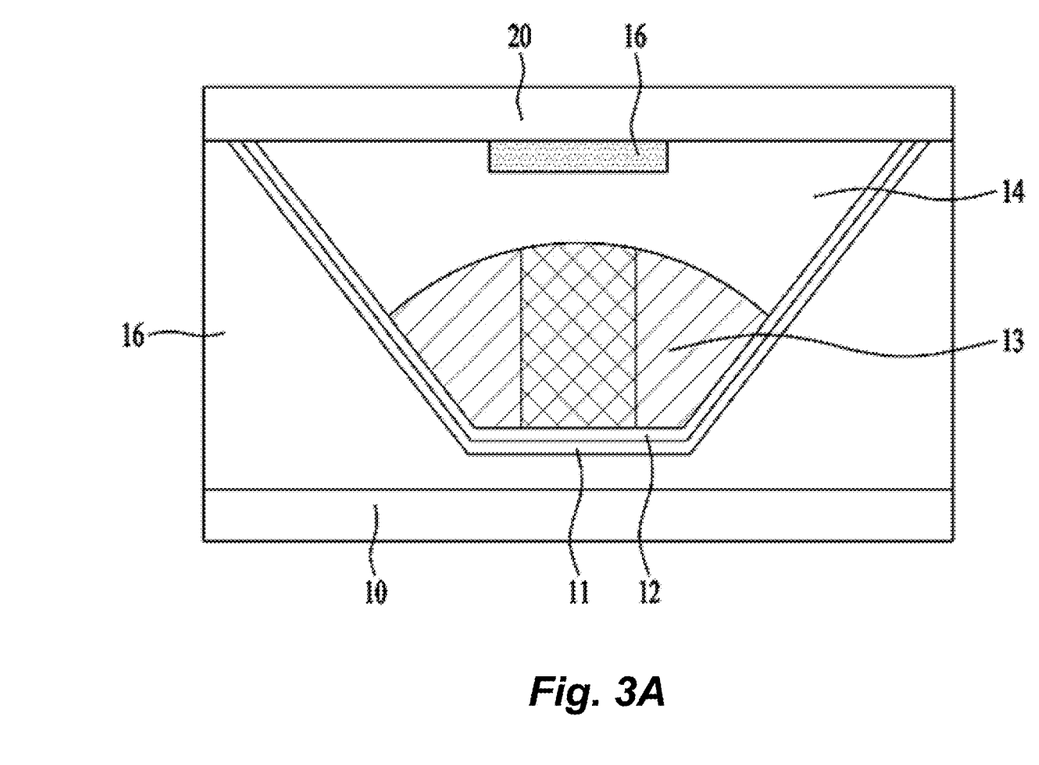
FIG. 3A is a cross-sectional view illustrating the effective lens portion of a conventional liquid lens.

FIG. 3A is a view illustrating the effective lens portion of a conventional liquid lens, and FIG. 3B is a view illustrating the effective lens portion of the liquid lens according to embodiments of the present disclosure. In FIG. 3A, the dark portion (i.e., the cross-hatched portion in the central region of the oil layer 13) indicates the portion that may not act as a lens. In the conventional liquid lens having the inclined partition 16, since the index of refraction of the material in which the chamber is formed differs from the index of refraction of oil, a phenomenon in which light introduced from the side portion and bottom portion of the chamber is refracted at the interface of the chamber and the oil occurs. Thereby, undesired distortion of light occurs, and thus, as illustrated in FIG. 3A, the effective lens portion of the liquid lens is reduced, which results in a reduced fill factor of the liquid lens.

Figure 3B:
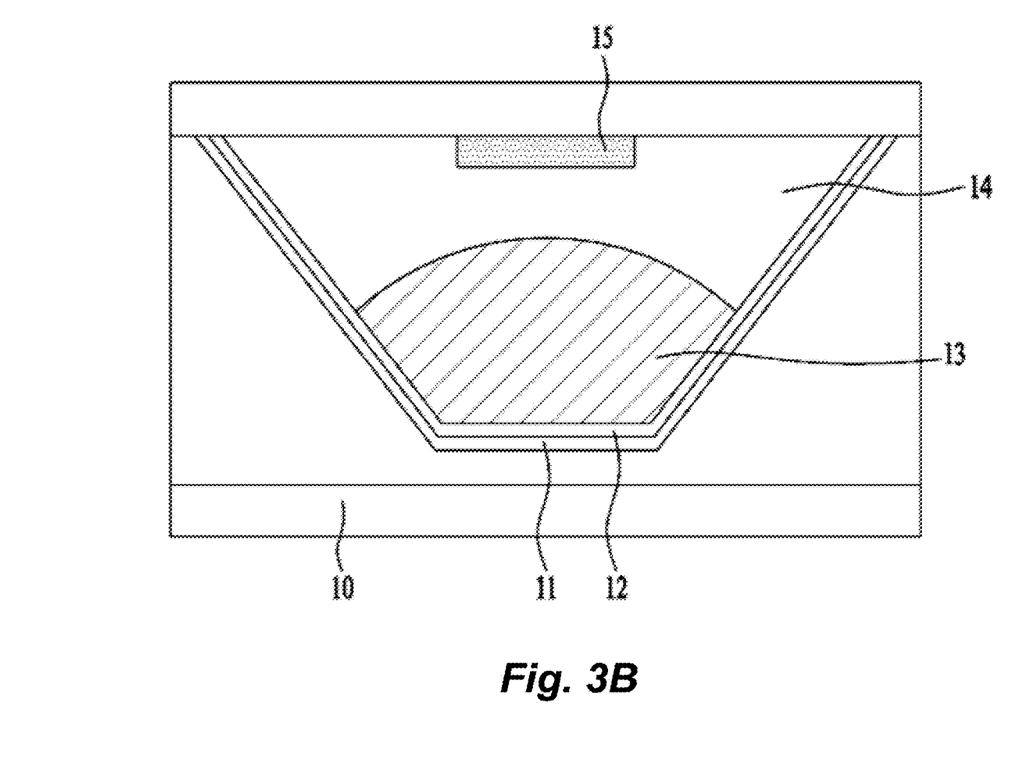
FIG. 3B is a cross-sectional view illustrating the effective lens portion of the liquid lens according to embodiments of the present disclosure.

On the other hand, as illustrated in FIG. 3B, when the indices of refraction of the material 21 in which the chamber is formed and the oil are matched, light introduced from the side portion and bottom portion of the chamber is not refracted at the interface of the chamber and the oil. Thereby, the entire area of the liquid lens may be used as a lens. Thus, as illustrated in FIG. 3B, the effective lens portion of the liquid lens is increased, which results in an increased fill factor of the liquid lens.

Figure 4A:
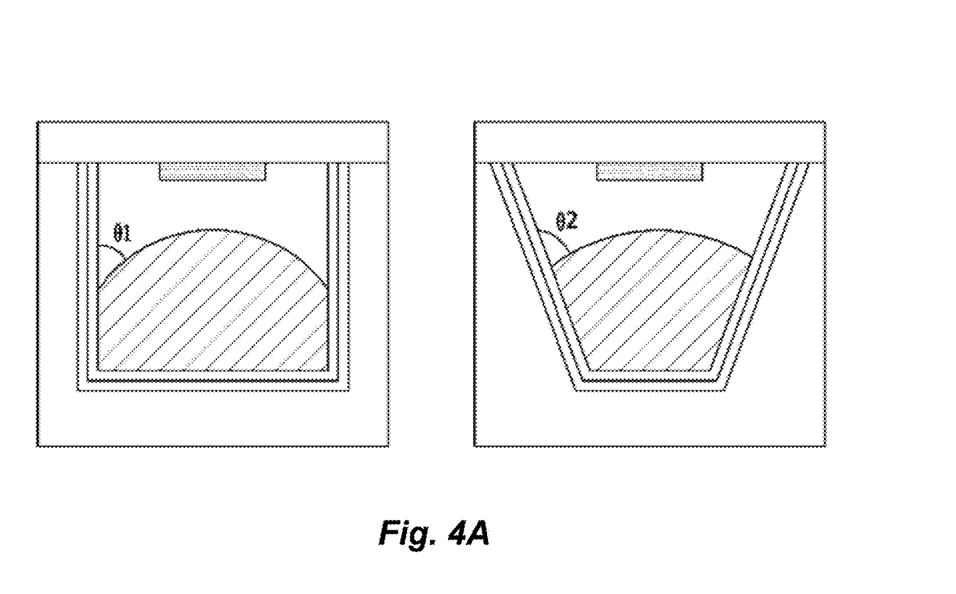
FIG. 4A is a cross-sectional view illustrating a principle whereby the diopter of the liquid lens according to embodiments of the present disclosure is increased.
Figure 4B:
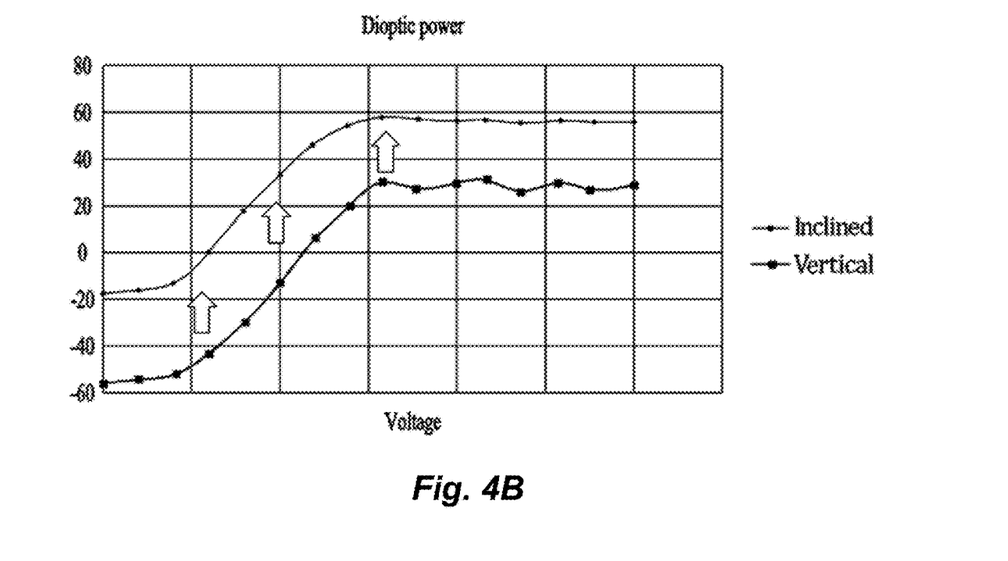
FIG. 4B is a graph showing the increase in diopter depending on variation in the drive voltage of the liquid lens according to embodiments of the present disclosure.

FIG. 4A is a view for explaining the principle whereby the diopter of the liquid lens according to the present disclosure is increased, and FIG. 4B is a graph for explaining the increase in diopter depending on variation in the drive voltage of the liquid lens according to the present disclosure.

When a voltage is applied between the first electrode 11 and the second electrode 15 of the liquid lens 100, the curvature of the interface between the oil layer 13 and the conductive liquid 14 is changed according to variations in voltage. Here, the diopter of the liquid lens 100 is determined by the contact angle between the oil layer 13 and the conductive liquid 14. When the contact angle between the oil layer 13 and the conductive liquid 14 is increased, the diopter of the liquid lens 100 is also increased.

Referring to FIG. 4A, it can be appreciated that, when the chamber 17 of the liquid lens includes the inclined partition 16, the gradient of the partition 16 may be added to the contact angle between the oil layer 13 and the conductive liquid 14. Thereby, the contact angle $\theta_2$ between the oil layer 13 and the conductive liquid 14 when the chamber 17 of the liquid lens has the inclined partition 16 is greater than the contact angle $\theta_1$ when the chamber 17 of the liquid lens has a vertical partition.

Referring to FIG. 4B, it can be appreciated that, when same voltages are applied to the liquid lens having the chamber 17 provided with the vertical partition and the liquid lens having the chamber 17 provided with the inclined partition 16, the liquid lens having the chamber 17 provided with the inclined partition 16 has a higher diopter.

As described above, the liquid lens having the chamber 17 provided with the inclined partition 16 may achieve a higher diopter with a lower drive voltage compared to the liquid lens having the chamber 17 provided with the vertical partition.

In other words, the liquid lens having the chamber provided with the inclined partition 16 may suffer from a reduction in the fill factor of the effective lens portion. In the liquid lens of the present disclosure, by adjusting the index of refraction of the oil layer 13 so as to correspond to the index of refraction of the material 21 in which the chamber 17 is formed, light introduced from the side portion and bottom portion of the chamber is not refracted at the interface between the chamber and the oil. Thereby, the entire area of the liquid lens may be used as a lens.

Figure 5A:
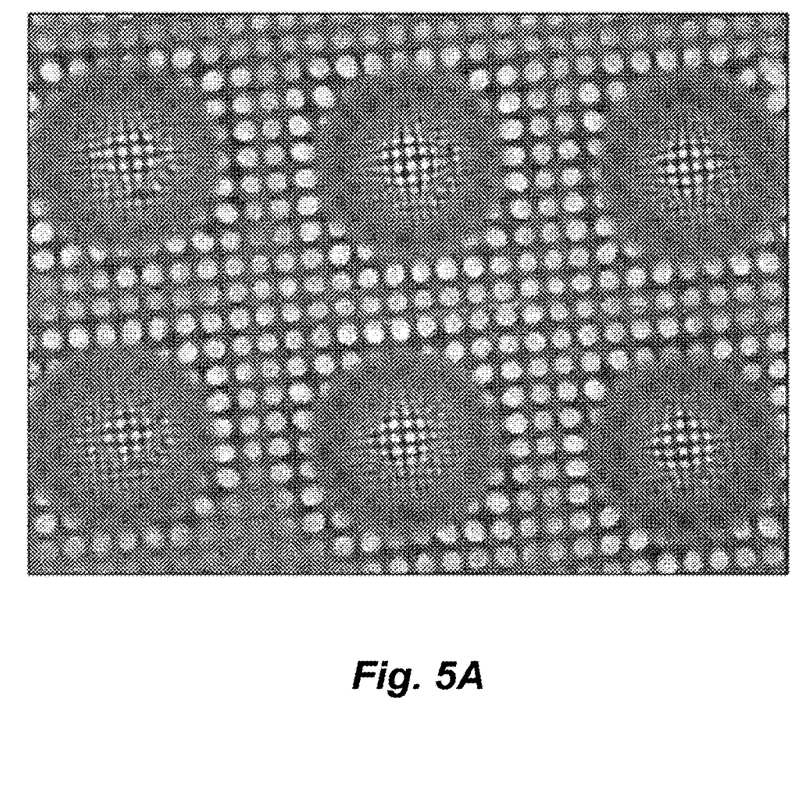
FIGS. 5A and 5B are microscopic images for explaining an enhancement in the fill factor of the liquid lens according to embodiments of the present disclosure.
Figure 5B:
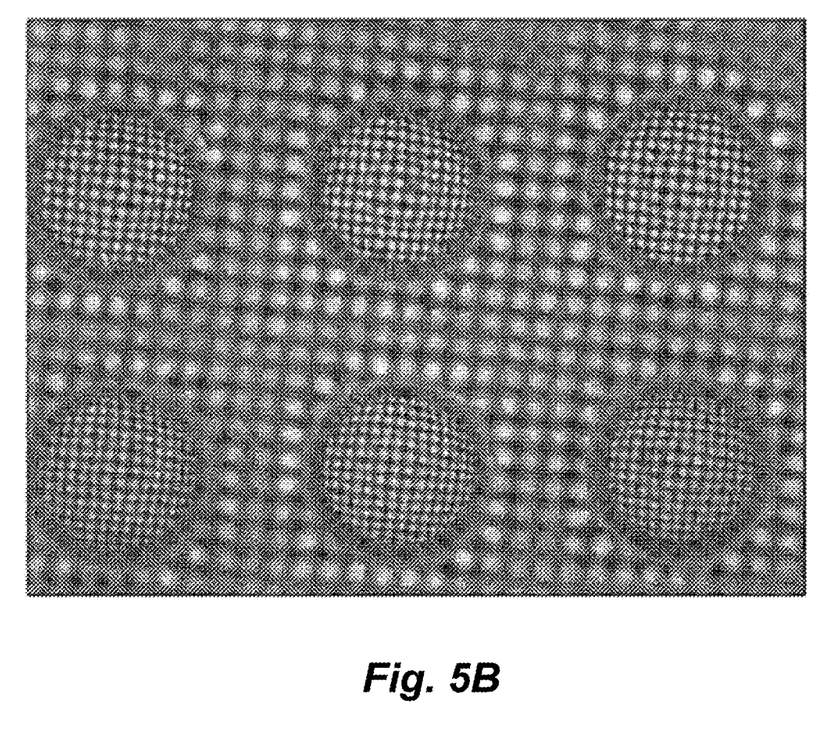

FIGS. 5A and 5B are views illustrating respective microscopic images for explaining an enhancement in the fill factor of the liquid lens according to embodiments of the present disclosure.

FIG. 5A is a microscopic image obtained by forming the oil layer 13, inside the chamber provided with the inclined partition, using a single dodecane material, and then observing a dot pattern image thereof. FIG. 5B is a microscopic image obtained by forming the oil layer 13, inside the chamber formed in a material 21 consisting of PMMA, provided with the inclined partition, using an oil mixture in which chloronaphthalene and dodecane are mixed at a ratio of 6:4 approximately (about range of 5.7:4.3~6.3:3.7), and then observing a dot pattern image thereof.

It can be found that each liquid lens of FIG. 5B has a wider area in which a dot pattern may be observed, compared to FIG. 5A.

As is apparent from the above description, a liquid lens of the present disclosure includes a chamber provided with an inclined partition, thus realizing a higher diopter at a lower drive voltage compared to a liquid lens having a chamber provided with a vertical partition.

In the liquid lens of the present disclosure, by adjusting the index of refraction of an oil layer so as to correspond to the index of refraction of the material in which the chamber is formed, there occurs no refraction of light, introduced from the side portion and bottom portion of the chamber, at the interface between the chamber and the oil. Thereby, the area of the liquid lens that may act as a lens may be increased, which may enhance the fill factor of the liquid lens.

In addition, in the liquid lens of the present disclosure, the chamber provided with the inclined partition may be simply formed by applying heat and pressure to a mold having the shape of the chamber provided with the inclined partition in the state in which the mold is in contact with a plastic plate. Therefore, the liquid lens of the present disclosure may ensure easy formation of the chamber at a low manufacturing cost and using a simplified process.

It will be apparent to those skilled in the art that the present disclosure described above is not limited to the embodiments described above and the accompanying drawings, and various substitutions, modifications, and alterations may be devised within the spirit and scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:
1. A liquid lens comprising:
  a chamber formed in a first material, the chamber having a surface and inclined sidewalls that extend from the surface, the first material having an index of refraction;
  a first electrode covering the surface and the inclined sidewalls of the chamber, the first electrode being a transparent electrode;
  an oil layer in the chamber, the oil layer including a mixture of a first oil and a second oil, the first oil and the second oil having different indices of refraction, the oil layer having an index of refraction corresponding to the index of refraction of the first material; and a conductive liquid on the oil layer, wherein the oil layer includes chloronaphthalene within a range from 57 vol % to 63 vol % and dodecane within a range from 43 vol % to 37 vol %.

2. The liquid lens according to claim 1, wherein the inclined sidewalls have an inclination angle within a range from 40 degrees to 70 degrees with respect to the surface of the chamber.

3. The liquid lens according to claim 1, further comprising:

an insulation layer on the first electrode.

4. The liquid lens according to claim 1, wherein the index of refraction of the oil layer and the index of refraction of the first material are within ±0.2 of one another.

5. The liquid lens according to claim 1, wherein the first material comprises a transparent plastic material including at least one of: polymethyl methacrylate (PMMA), polyethylene tetraphthalate (PET), and polycarbonate (PC).

6. The liquid lens according to claim 1, wherein the first material includes polymethyl methacrylate (PMMA).

7. The liquid lens according to claim 1, further comprising a second electrode that contacts the conductive liquid.

8. A liquid lens comprising:

a chamber formed in a first material, the chamber having a surface and inclined sidewalls that extend from the surface, the first material having an index of refraction;

an oil layer in the chamber, the oil layer including a mixture of a first oil and a second oil, the first oil and the second oil having different indices of refraction, the oil layer having an index of refraction within ±0.2 of the index of refraction of the first material; and a conductive liquid on the oil layer, wherein the index of refraction of the oil mixture is determined by the following Equation:

$$n^{id} = [\phi_A(n^*_A)^2 + \phi_B(n^*_B)^2]^{1/2}$$

where, $\emptyset_A$ and $\emptyset_B$ are respectively percentages of the first oil and the second oil, and $n^*_A$ and $n^*_B$ are respectively indices of refraction of the first oil and the second oil.

9. The liquid lens according to claim 8, further comprising:

a transparent electrode covering the surface and the inclined sidewalls of the chamber.

10. A liquid lens module comprising:

a first substrate;

a liquid lens array disposed on the first substrate, and the liquid lens array including a plurality of liquid lenses, each of the liquid lenses including:

a chamber formed in a first material, the chamber having a surface and inclined sidewalls that extend from the surface, the first material having an index of refraction;

a first electrode covering the surface and the inclined sidewalls of the chamber, the first electrode being a transparent electrode;

an oil layer in the chamber, the oil layer including a mixture of a first oil and a second oil, the first oil and the second oil having different indices of refraction, the oil layer having an index of refraction corresponding to the index of refraction of the first material; and a conductive liquid on the oil layer; and a second substrate opposite the first substrate, wherein the oil layer includes chloronaphthalene within a range from 57 vol % to 63 vol % and dodecane within a range from 43 vol % to 37 vol %.

11. The liquid lens module according to claim 10, wherein the inclined sidewalls have an inclination angle within a range from 40 degrees to 70 degrees with respect to the surface of the chamber.

12. The liquid lens module according to claim 10, each of the liquid lenses further including:

an insulation layer on the first electrode.

13. The liquid lens module according to claim 10, wherein the index of refraction of the oil layer and the index of refraction of the first material are within ±0.2 of one another.

14. The liquid lens module according to claim 10, wherein the first material comprises a transparent plastic material including at least one of: polymethyl methacrylate (PMMA), polyethylene tetraphthalate (PET), and polycarbonate (PC).

15. The liquid lens module according to claim 10, wherein the first material includes polymethyl methacrylate (PMMA).

16. The liquid lens module according to claim 10, further comprising a second electrode that contacts the conductive liquid.

17. A liquid lens module comprising:

a first substrate;

a liquid lens array disposed on the first substrate, and the liquid lens array including a plurality of liquid lenses, each of the liquid lenses including:

a chamber formed in a first material, the chamber having a surface and inclined sidewalls that extend from the surface, the first material having an index of refraction;

an oil layer in the chamber, the oil layer including a mixture of a first oil and a second oil, the first oil and the second oil having different indices of refraction, the oil layer having an index of refraction within ±0.2 of the index of refraction of the first material; and a conductive liquid on the oil layer; and a second substrate opposite the first substrate, wherein the index of refraction of the oil mixture is determined by the following Equation:

$$n^{id} = [\phi_A(n^*_A)^2 + \phi_B(n^*_B)^2]^{1/2}$$

where, $\emptyset_A$ and $\emptyset_B$ are respectively percentages of the first oil and the second oil, and $n^*_A$ and $n^*_B$ are respectively indices of refraction of the first oil and the second oil.

18. The liquid lens module according to claim 17, wherein each of the liquid lenses includes:

a transparent electrode covering the surface and the inclined sidewalls of the chamber.

* * * * *